United States Patent [19]
Ploppa
[11] 3,896,297
[45] July 22, 1975

[54] ELECTRONIC COUNTER SYSTEM WITH VARIABLE COUNTING RANGES

[76] Inventor: Jurgen Ploppa, Postfach 73, Reutlingen, Germany

[22] Filed: May 18, 1973

[21] Appl. No.: 361,491

[30] Foreign Application Priority Data
May 18, 1972 Germany ............................ 2234309

[52] U.S. Cl. ........ 235/92 PD; 235/92 PE; 235/92 R; 66/154 A; 328/48
[51] Int. Cl. ............................................ H03k 21/36
[58] Field of Search ....... 235/92 PD, 92 PE, 92 CC, 235/92 ST; 328/48; 66/154 A

[56] References Cited

UNITED STATES PATENTS 3,534,398 10/1970 Wajda ............................ 235/92 PE
3,674,991 7/1972 Isvetkov et al. ................ 235/92 PD

*Primary Examiner*—Joseph M. Thesz, Jr.
*Attorney, Agent, or Firm*—Larson, Taylor & Hinds

[57] ABSTRACT

An adjustable electronic counter system, usable in counting pattern repetitions in flat knitting machines, provides variable counting ranges. The system includes at least two decade counters and a plurality of selector systems and produces automatic changeover from a first counting range to the next counting range when a desired, preselected number in the first range is reached. The ranges are arranged in additive series so that they can be serially combined to increase the system capacity.

3 Claims, 1 Drawing Figure

PATENTED JUL 22 1975 3,896,297
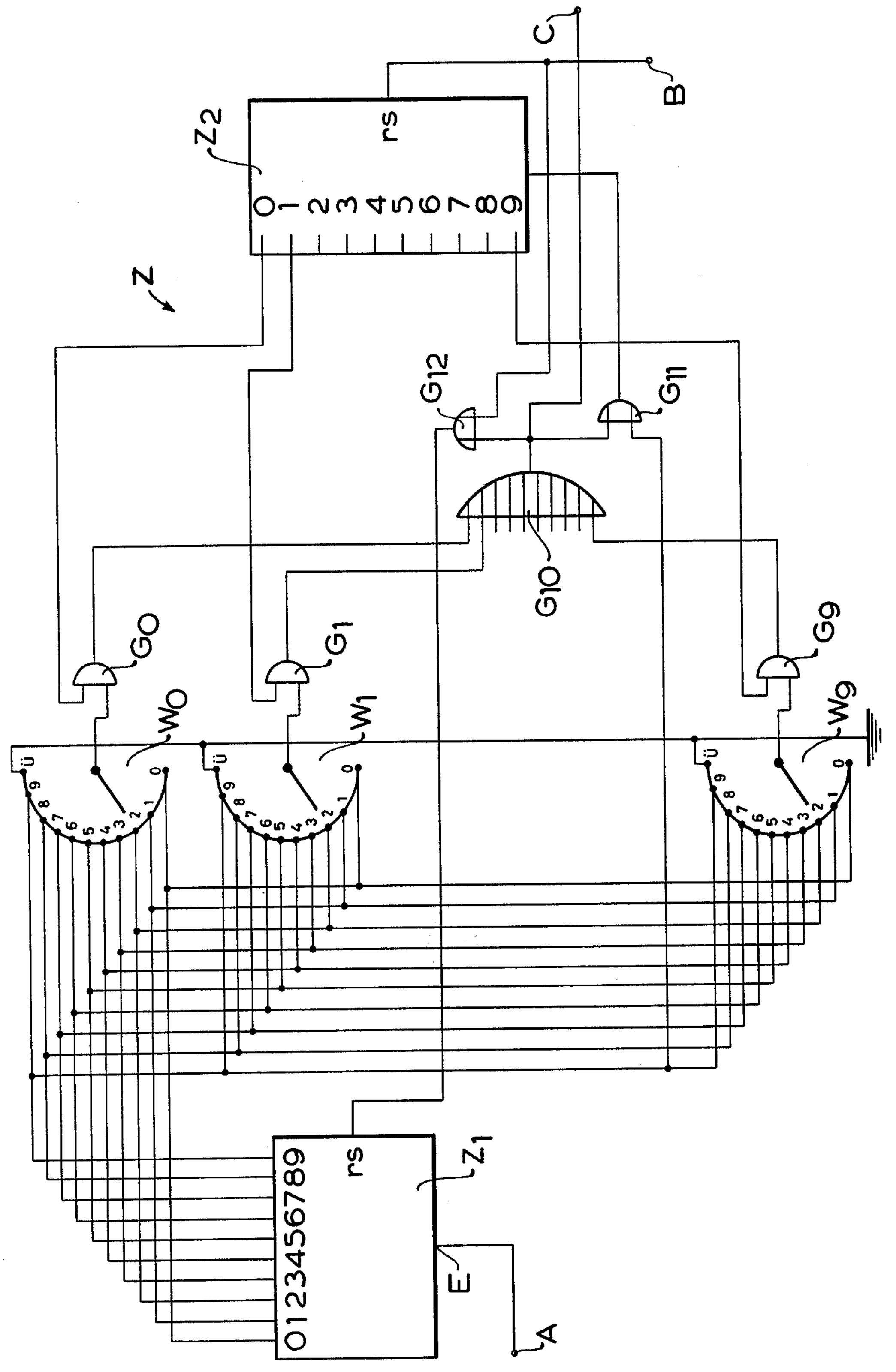

ELECTRONIC COUNTER SYSTEM WITH VARIABLE COUNTING RANGES

FIELD OF THE INVENTION

This invention relates to an adjustable electronic counter system providing variable counting ranges and is particularly useful in pattern counting for flat knitting machines.

BACKGROUND OF THE INVENTION

It is known in connection with knitting machines, particularly flat knitting machines, which produce goods with repeating patterns, to use counters to count the repetitions of these patterns so that the pattern information does not have to be fed repeatedly into the program.

In flat knitting machines, use is made for this purpose of mechanical pattern repetition counters, these counters being constituted by so-called counter discs. Such counter discs have a predetermined total counting range represented by a number of holes. Partial counting ranges are provided by introducing screwed pins into these holes, these pins then determining the number of pattern repetitions.

Accordingly, when the choice of the individual partial counting ranges has been made by a particular arrangement of the pins, the number of pattern repetitions cannot be varied at will because a reduction in the first partial counting range brings about an unintended increase in the size of the second partial counting range, and vice versa. For this reason it is necessary, for example, when there is a reduction in the number of pattern repetitions in the first counting range, e.g., to five, to move the following pin which determines the beginning and the number of pattern repetitions in the second counting range, by the same amount, namely through five holes on the counter disc in the direction of the first counting range. The same action must be taken with regard to the other pins which determine the succeeding numbers of repetitions, because the relative distance must always be the same. This procedure is rather obviously a nuisance and is difficult to execute, especially since a variation of a partial counting range cannot be undertaken when the knitting machine is in operation.

SUMMARY OF THE INVENTION

In accordance with the present invention, the mechanical pattern repetition counter heretofore used in flat knitting machines is replaced by an adjustable electronic counter which provides a number of important advantages.

The electronic counter assembly with variable counting ranges provided in accordance with this invention is characterized in the provision of two or more counter decades and a predetermined number of selector switches, the latter being connected to the counter decades so that when the required, and pre-set, number in a counting range of one of the selector switches is reached there is simultaneously emitted a switching signal which automatically causes a changeover to the next counting range.

In accordance with a further aspect of the invention, the counting ranges are arranged in additive series so that other and larger counting capacities can be obtained by appropriate signal combination of the individual counting ranges, the maximum countable number being equal to the total capacity of the system. The series arrangement of the selector switches terminates in an overrun position and means are provided for suppressing the switching signal such that no additional switch is necessary to enable individual counting ranges to be combined.

In a convenient embodiment of the invention, the counter system incorporates two decade counters to provide a total counting range of 99, and 10 selector switches each providing ten counting stages and one overrun position.

BRIEF DESCRIPTION OF THE DRAWINGS

A specific example of the invention is illustrated in the accompanying drawing in which, the single FIGURE is a schematic circuit diagram of an electronic counter with variable counting ranges in accordance with the invention.

DESCRIPTION OF A PREFERRED EMBODIMENT

Referring to the single FIGURE of the drawing there is illustrated an electronic counter assembly or system, generally denoted Z, which provides a total capacity of 99 counting steps, and includes ten adjustable part-ranges with counting ranges up to nine. Counter system Z comprises a pair of counters $Z_1$ and $Z_2$, 10 selector switches (three of which, $W_0$, $W_1$ and $W_9$ are shown), ten AND gates (three of which $G_0$, $G_1$ and $G_9$, are shown), a first OR gate $G_{10}$ connected to the outputs of the AND gates, and a further pair of OR gates $G_{11}$ and $G_{12}$.

The first counter $Z_1$ is advanced, always to the extent of one position, by a signal at an input A, which may occur, for example at the end of a knitted repeat. Counter $Z_1$ counts to 10 and includes ten outputs connected to corresponding switching steps of the selector switches $W_0$, $W_1$ and $W_9$. Counters $Z_1$ and $Z_2$ both include reset inputs rs and are initially brought to their starting condition, i.e., initialized, by a signal at an input B, although in the case of counter $Z_1$, re-setting is effected through OR-gate $G_{12}$ as indicated. As stated, the 10 outputs of the first counter $Z_1$ are respectively connected to the ten positions of ten selector switches $W_0$ to $W_9$, each selector switch including an eleventh position, viz., an over-run position, U, used to bring the counting ranges successively into operation as discussed below.

The AND gates $G_0$ to $G_9$, together with the count position of the second counter $Z_2$, determine which selector switch shall be enabled or active. The selector switch arm of each of the selector switches $W_0$ to $W_9$ forms one input to the corresponding AND gate $G_0$ as indicated. With the counters $Z_1$ and $Z_2$ brought into the starting position, i.e., reset to zero, the selector switch $W_0$ is activated. Counter $Z_1$ is then switched by signals at input A in a stepwise manner from 0 to 9. When the number set at selector switch $W_0$ is reached, a signal is transmitted to corresponding AND gate $G_0$ which resets counter $Z_1$ to zero through gates $G_{10}$ and $G_{12}$, the output of gate $G_{10}$ forming one input of gate $G_{12}$ as shown. The counter $Z_2$ is advanced by one position by the same signal, through gate $G_{11}$ which is also connected to the output of gate 10, so that the selector switch $W_1$ is now activated. The signal which brings counter $Z_1$ into its starting position provides an output at C and causes a changeover to a new pattern repeat.

If the selector switch $W_0$ is in position U and counter $Z_1$ reaches position 9, gate $G_0$ is blocked and no signal passes to gate $G_{10}$. However, a signal is produced at gate $G_{11}$ that advances the counter $Z_2$, which is also a decade counter, through one position. No signal occurs, however, at output C for a repeat change. Thus, under these circumstances, selector range $W_0$ and selector range $W_1$ are combined. Should the selector switch $W_1$ be at position U in the corresponding selector range, the selector range $W_2$ will also be added to the previous selector ranges $W_0$ and $W_1$. It will be appreciated that the same operation can take place for all possible combinations of the selector switches thereby providing a very flexible counter system which can fulfill the requirements of a repeat counter and can be used in an electronically controlled machine.

Although the invention has been described relative to an exemplary embodiment thereof, it will be understood that variations and modifications may be effected in this exemplary embodiment without departing from the scope and spirit of the invention.

I claim:

1. In a flat knitting machine, an adjustable electronic counter system providing variable counting ranges for counting pattern repetitions, said counter system comprising a plurality of selector switches connected together in serial relationship, each said selector switch including a preselected plurality of sequential selector positions which constitute the counting range of that switch, a first decade counter which is connected to receive a signal related to the pattern count and which includes a plurality of outputs each of which is individually connected to a corresponding selector position of each of the selector switches, a plurality of AND gates each having a first input connected to the output of a corresponding selector switch, a further decade counter having a plurality of outputs, each said output of said further decade counter being individually connected to the second input of a corresponding AND gate, and an OR gate connected to the outputs of said AND gates and having an output connected to the counting input to said second decade counter, each said selector switch including an overrun position which is connected to ground and said counter system including means for interconnecting said selector switches and said decade counters such that when one of said selector switches is set to the overrun position, the corresponding AND gate is disabled and the next said selector switch is enabled so that the counting range of said next selector switch is added to that of said one selector switch.

2. An adjustable electronic counter system providing variable counting ranges, said system comprising a first decade counter for counting the input pulses to the system; a predetermined number of selector switches, each switch having a preselected plurality of sequential selector positions constituting the counting range of that switch and an overrun position; a second decade counter for controlling enabling of said selector switches in sequence; and means interconnecting the decade counters and said selector switches, for, responsive to a first selector switch being set to said overrun position, suppressing the output of said first selector switch and hence the output of said system and automatically causing changeover to the counting range of the next selector switch such that the counting ranges of said first selector switch and said next selector switch are combined so that the system can count up to a number which is equal to the total of the selector positions of said first and next selector switches, the maximum number countable by said system being equal to the combined total capacity of the selector switches.

3. An adjustable electronic counter system as claimed in claim 2 wherein said system incorporates two decade counters and ten selector switches each having ten selector positions and one overrun position, the system thereby providing a maximum total counting range of 99.

* * * * *